_United States Patent Office_ 3,646,227
Patented Feb. 29, 1972

3,646,227
HYDROGENATION OF ALDEHYDE IMPURITIES
Reuben H. Grinstein, Houston, Tex., assignor to Shell
Oil Company, New York, N.Y.
No Drawing. Filed Nov. 12, 1968, Ser. No. 775,169
Int. Cl. C07c 29/24
U.S. Cl. 260—643 B    6 Claims

ABSTRACT OF THE DISCLOSURE

The effective life of solid nickel hydrogenation catalysts used in hydrogenation of aldehyde and acetal impurities in aliphatic alcohols prepared by the carbonylation and hydrogenation of olefin is improved by the use of a solid basic substance in the catalyst bed.

BACKGROUND OF THE INVENTION

Aliphatic alcohols, and particularly those of higher molecular weight, are highly useful in the organic chemicals industry. These alcohols can be produced by hydrogenation of corresponding oxo process aldehydes. In many applications it is essential that these alcohols be free from carbonyl contamination, whether present initially as such or as acetals thereof. Such compounds, whether present as free aldehydes or as combined species which are capable of reverting to free aldehydes, e.g., acetals, have deleterious effects on the color and odor of some alcohol derivatives. It is known that free aldehyde contamination in alcohols can be reduced during purification by further polishing hydrogenation. Combined carbonyl species are much more difficult to remove, since they are not as readily hydrogenated. Distillation is usually required to remove them. It is desirable to minimize the amount of acetal present so that polishing hydrogenation of the free aldehydes alone will lower sufficiently the carbonyl content.

It is conventional to polish hydrogenate the impure alcohol by passing it with hydrogen over a stationary bed of a solid supported catalyst at elevated temperatures and pressures. The prior art discloses numerous metal and metal compound catalysts with various types of carriers and binders which are useful in this service.

Two desirable characteristics of hydrogenation catalysts are high catalytic activity and the ability to maintain this activity. Due to the relatively high cost and short life of active hydrogenation catalysts, any improvement in catalyst life is highly desirable. Numerous catalyst promoters and special formulations have been developed to enhance these two properties.

As the hydrogenation catalyst loses activity in this use, it allows increasing amounts of unreduced carbonyl compounds to pass. Moreover, certain active hydrogenation catalysts also with age tend increasingly to promote the reaction of aldehydes with alcohols to form acetals. This generation of difficultly hydrogenatable combined species from easily hydrogenatable species raises the total amount of unreduced carbonyl precursor compounds passing from the hydrogenator and gives the appearance of a catalyst deactivation. Importantly, this apparent catalyst deactivation, through the generation of combined carbonyl species, takes place much more rapidly than the actual deactivation. The exact nature of the cause of this increase with time in the tendency of active hydrogenation catalyst to promote acetal formation is not fully understood. Relative catalyst acidity appears to be important but other as yet undetermined characteristics of these catalysts, such as tendencies to absorb certain catalyst poisons, may be the cause.

It has now been found that certain heterogeneous hydrogenation catalysts which have basic catalyst supports have much less tendency to promote the formation of combined species, while retaining the essential hydrogenating activity. It is known that the reaction which forms the combined species in homogeneous systems is acid-catalyzed. Prior art acidic heterogeneous catalysts are recommended to promote acetal formation.

There are two known techniques for reducing acetal formation. If water is added to the alcohol-carbonyl feed or if the reaction temperature is raised, the amount of combined species formed is reduced. Water addition has the disadvantage of contaminating the resulting alcohol with water so that further purification is required. Water is also known to weaken the physical strength of many supported hydrogenation catalysts. Elevated temperatures in a hydrogenator favor cracking, decarbonylation and other very undesirable side reactions.

STATEMENT OF THE INVENTION

It has now been discovered that polishing hydrogenation of aldehyde and acetal impurities in aliphatic alcohols using non-basic hydrogenation catalysts can be carried out with much decreased acetal formation when limited amounts of certain basic materials are used in combination with the catalyst. This use of basic materials greatly extends the useful life of non-basic hydrogenation catalysts, makes possible the use of many reasonably priced commercially available non-basic hydrogenation catalysts in polishing service, and obviates the need to develop and utilize specialty catalysts. In accordance with the present invention, the alcohol-carbonyl mixture to be hydrogenated is contacted, together with hydrogen, under hydrogenation conditions with a solid, insoluble, basic material befor it is contacted under hydrogenation conditions with a non-basic hydrogenation catalyst.

Not only do basic materials extend the life of non-basic hydrogenation catalysts but also periodic addition of small fresh charges of basic material prior to a bed of non-basic catalyst can effect partial reactivation of the non-basic bed. Although not known with certainty, it appears that this reactivation may result from the basic material effecting an equilibrium involving the non-basic catalysts tendency to promote acetal formation.

DESCRIPTION OF PREFERRED EMBODIMENTS

The basic material employed in the process is a solid and can be a Lewis or Bronsted Base. This basic material can be present as a hydrogenation catalyst having a basic support or as an otherwise inert basic material. Preferred basic materials comprise alkaline earth metal oxides or aluminates, such as calcium aluminate, magnesium aluminate and magnesium oxide. Especially preferred is calcium aluminate.

The conventional solid hydrogenation catalyst employed in the process comprise catalysts of nickel and the noble metals on supports comprising alumina, kieselguhr, silica, and zeolites. Preferred conventional catalysts comprise catalysts containing nickel. Specially preferred catalysts comprise pelletized nickel catalysts containing over 30% by weight nickel.

The process of the invention is carried out in any suitable type of apparatus enabling the passing of the admixed reactants through a stationary combination of the basic material and the active hydrogenation catalyst.

In a preferred method the hydrogenation reaction is executed with the aid of apparatus providing for the positioning of the active hydrogenation catalyst and the basic material as contiguous portions of a single continuous stationary bed; the part of such a single bed first traversed by the reactants comprising the basic material, the remainder of said bed containing the active hydrogenation catalyst. In another preferred method, the reaction is executed with the aid of apparatus providing for a plurality of separate stationary beds arranged serially; the first of said beds traversed by the reactants comprising the basic material and the remainder of said beds containing the active hydrogenation catalyst.

The ratio of base-containing material to active hydrogenation catalyst may vary within the scope of the invention. In general, however, the total will consist predominantly of the active hydrogenation catalyst, the base-containing material constituting only a minor part thereof. The base-containing material may comprise from about 5% to about 35% by volume, preferably from about 20% to about 30% by volume, of the total. The relative amount of base-containing material preferably employed will vary to some extent with the specific basic material and active hydrogenation catalyst used.

The process of this invention is suitable for the hydrogenation of aldehyde and acetal impurities, in concentrations of up to about 10% by weight, in individual or mixed aliphatic alcohols of from about 3 to about 20 carbon atoms. Preferred feedstocks comprise individual or mixed aliphatic alcohols of from about 4 to about 15 carbon atoms containing up to about 4% by weight aldehyde impurities of the types normally found in Oxo process-produced aliphatic alcohols; that is the aldehyde and acetal impurities comprise primarily those aldehydes or acetals which correspond to the alcohols and only to a lesser extent are other aldehydes and acetals present. Specially preferred feedstocks comprise individual or mixed normal, primary, aliphatic alcohols of from about 10 to about 15 carbon atoms with up to about 4% by weight carbonyl impurities comprised primarily of aldehydes corresponding to the alcohols.

The following examples illustrate the process of the invention and its advantages.

EXAMPLE 1

An active nickel hydrogenation catalyst, having a relatively acidic support, was placed in a single vertical tubular reactor and used in polishing hydrogenation service. The feedstock comprised about 99% by weight primary aliphatic alcohols having from 12 to 15 carbon atoms, about 1% by weight aldehydes corresponding to these alcohols, and traces of other carbonyl-containing materials. This material was contacted in a continuous manner with the catalyst at a liquid hourly space velocity of 0.5 in the presence of an excess of hydrogen beyond that required to reduce all the carbonyl compounds present. The process was run for 52 days at about 250–270° C. The liquid feed and product were sampled periodically and the changes in total carbonyl content and in acetal content effected by passage through the hydrogenator were determined. Total carbonyl content was always reduced by the hydrogenator; acetal content was always increased. Apparent first-order reaction rate constants for the acetal-forming reaction were calculated periodically from the increases in acetal content and the known residence time of the liquid mixture in the hydrogenator by the following equation:

Acetal formation rate constant, hours$^{-1}$ $$= \frac{1}{\text{Liquid residence time in reactor, hours}} \times \text{logarithm of} \left( \frac{\text{Acetal content of product}}{\text{Acetal content of feed}} \right)$$

These rate constants are tabulated in Table 1. As can be seen, the acetal make rate increased rapidly. After about 50 days use, the acetal make rate became so high that the total carbonyl passed by the hydrogenator was too great and catalyst replacement was necessary.

EXAMPLE 2

The procedure of Example 1 was carried out using a nickel catalyst having a basic calcium aluminate support. Acetal make rate constants were calculated and are listed in Table 1. As can be seen, although the acetal make rate increases with time, it was much lower than that observed with the acidic catalyst. For a period equivalent to the effective life of the acidic catalyst (50 days) the acetal make rate was nil. After 87 days of use, the make rate with the basic catalyst was about one-fifth the initial rate with the acidic catalyst. Unfortunately, the overall hydrogenation activity of this catalyst was not high, and unacceptable amounts of free carbonyl were allowed to pass the hydrogenator.

TABLE 1.—RATE OF ACETAL FORMATION OVER HYDROGENATION CATALYSTS

| | Apparent acetal formation rate constant, hours$^{-1}$ | |
| --- | --- | --- |
| | Example 1 (acidic support) | Example 2 (basic support) |
| Catalyst age in days: | | |
| 10 | 0.27 | 0 |
| 14 | 0.38 | 0 |
| 16 | 0.48 | 0 |
| 20 | | 0 |
| 21 | 0.36 | |
| 25 | | 0 |
| 32 | 0.59 | |
| 33 | | 0.024 |
| 38 | 1.71 | 0 |
| 40 | 1.14 | 0.017 |
| 42 | 1.42 | 0 |
| 48 | 1.54 | 0 |
| 52 | 1.05 | 0 |
| 62 | 0.041 | |
| 73 | | 0.026 |
| 87 | | 0.048 |

EXAMPLE 3

The experiment of Example 1 was duplicated with one change. An additional hydrogenator which operated at similar conditions to the main hydrogenator was installed ahead of the main hydrogenator. This initial stage contained about one-fourth the volume of catalyst as the main hydrogenator. The small fore hydrogenator was charged with the basic support nickel catalyst used in Example 2 and the main hydrogenator was charged with the acidic support active nickel catalyst used in Example 1. Acetal make rates were calculated for the main hydrogenator and are listed in Table 2. As can be seen, the acetal make rate in the main hydrogenator *decreased* steadily to a minimum at 40 days and then slowly increased. Following 80 days' use, the acetal make rate in the main hydrogenator was approximately one-half the *initial* value of the single acidic bed in Example 1. Overall catalyst activity was good throughout the experiment, and total carbonyl passed by the main hydrogenator was acceptably low. This addition of fresh basic material prior to the non-basic hydrogenation catalyst had the partial reactivating effect on the non-basic material of gradually reducing its acetal formation rate over a 40 day period. This is in addition to the basic material's later effect of slowing the rate of increase of acetal formation rate. Thus the effective life of the hydrogenation catalyst was extended from about fifty days to over eighty days through use of the process of this invention.

TABLE 2

Rate of acetal formation in hydrogenator charged with acidic-supported catalyst when preceded by a bed of basic-supported material (Example 3)

| Catalyst age, days | Apparent acetal formation rate constant [1] |
|---|---|
| 10 | 0.604 |
| 14 | 0.255 |
| 20 | 0.262 |
| 33 | 0.020 |
| 38 | 0.004 |
| 39 | 0.005 |
| 40 | 0.005 |
| 42 | 0.019 |
| 45 | 0.067 |
| 52 | 0.132 |
| 63 | 0.097 |
| 73 | 0.125 |
| 87 | 0.126 |

[1] Hours$^{-1}$ for acidic-supported bed only.

I claim as my invention:

1. The process for continuously hydrogenating aldehyde impurities in oxo alkanols which comprises contacting at elevated temperature an oxo alkanol feed, containing up to 10% weight aldehyde impurities, admixed with a quantity of hydrogen which is in excess of that stoichiometrically equivalent to the aldehyde impurities with a stationary catalyst bed which comprises as an initial bed from about 5 to about 35% by volume of a nickel catalyst comprising alkaline earth metal oxides or aluminates and as a second bed from about 95 to about 65% by volume of an active nickel hydrogenation catalyst having an acidic support.

2. The process in accordance with claim 1 wherein said oxo alkanol feed consists essentially of oxo alkanols having from 12 to 15 carbon atoms and up to 4% weight of the corresponding aldehydes.

3. The process in accordance with claim 1 wherein said initial bed comprises calcium aluminate.

4. The process for continuously hydrogenating aldehyde impurities in oxo alkanols which comprises contacting at elevated temperature an oxo alkanol feed, containing up to 10% weight aldehyde impurities, admixed with a quantity of hydrogen which is in excess of that stoichiometrically equivalent to the aldehyde impurities with a stationary catalyst bed which comprises as an initial part of a single bed from about 5 to about 35% by volume of a nickel catalyst comprising alkaline earth metal oxides or aluminates and as a second part of a single bed from about 95 to about 65% by volume of an active nickel hydrogenation catalyst having an acidic support.

5. The process in accordance with claim 4 wherein said oxo alkanol feed consists essentially of oxo alkanols having from 12 to 15 carbon atoms and up to 4% weight of the corresponding aldehydes.

6. The process in accordance with claim 4 wherein said initial part of a single bed comprises calcium aluminate.

References Cited

UNITED STATES PATENTS

| | | | |
|---|---|---|---|
| 2,009,948 | 7/1935 | Schmidt et al. | 260—638 B |
| 2,070,131 | 2/1937 | Joshua et al. | 260—638 B |
| 2,276,192 | 3/1942 | Harford et al. | 260—638 B |
| 2,524,566 | 10/1950 | Houtman et al. | 260—638 B |
| 2,525,354 | 10/1950 | Hoog et al. | 260—643 B |
| 2,780,643 | 2/1957 | Buchner et al. | 260—643 B |
| 3,260,683 | 7/1966 | Endler | 260—638 B |
| 3,374,184 | 3/1968 | McEvoy et al. | 260—638 B |

FOREIGN PATENTS

| | | | |
|---|---|---|---|
| 224,923 | 2/1958 | Australia | 260—638 B |

BERNARD HELFIN, Primary Examiner

J. E. EVANS, Assistant Examiner

U.S. Cl. X.R.

252—466, 473; 260—615 A, 638 B